(12) United States Patent
Probst

(10) Patent No.: US 6,499,389 B1
(45) Date of Patent: Dec. 31, 2002

(54) DEVICE FOR PRODUCING MILK FROTH FOR CAPPUCCINO

(75) Inventor: Emanuel Probst, Zürich (CH)

(73) Assignee: Jura Elekroapparate AG, Niederbuchsiten (*) Notice: Subject to any disclaimer, the term of this patent is extended or adjusted under 35 U.S.C. 154(b) by 0 days.

(21) Appl. No.: 09/787,803
(22) PCT Filed: Sep. 22, 1999
(86) PCT No.: PCT/EP99/07047
§ 371 (c)(1), (2), (4) Date: Mar. 23, 2001
(87) PCT Pub. No.: WO00/16674
PCT Pub. Date: Mar. 30, 2000

(30) Foreign Application Priority Data

Sep. 24, 1998 (DE) .................... 298 17 116 U

(51) Int. Cl.⁷ ................................ A47J 31/44
(52) U.S. Cl. .............. 99/323.1; 261/DIG. 16; 261/DIG. 76
(58) Field of Search ............... 99/323.1, 293, 99/279, 300, 287; 261/DIG. 16, DIG. 76

(56) References Cited

U.S. PATENT DOCUMENTS 5,265,519 A   11/1993   Schiettecatte et al. ........ 99/293
5,295,431 A * 3/1994   Schiettecatte et al. ........ 99/293
5,738,002 A * 4/1998   Marano-Ducarne .......... 99/293

FOREIGN PATENT DOCUMENTS

DE   89 07 183 U   7/1989
DE   197 05 633 A   8/1998
EP   0 344 859 A   12/1989
EP   0 801 922 A   10/1997
EP   0 858 757 A   8/1998

* cited by examiner

Primary Examiner—Reginald L. Alexander
(74) Attorney, Agent, or Firm—Venable; Norman N. Kunitz

(57) ABSTRACT

A device for producing milk froth for cappuccino, having a nozzle arrangement (1,2) that is disposed downstream of a steam pipe (4) and has a vacuum chamber (3), into which a milk supply line (6) terminates, and with am air conduit (8) connected to the milk supply line (6) upstream of the vacuum chamber (3). An emulsifying chamber (9) is disposed downstream of the vacuum chamber (3), with the emulsifying chamber having a chamber wall, a floor with a central, flow-diverting protrusion and an outlet. A settling segment (16) adjoins the outlet. For the fine-pored emulsification of milk froth with the device, the emulsifying chamber (9,23,32), which is embodied without separate air inlets, has at least two free cross sections that widen stepwise in the primary flow direction (10). The central, flow-diverting protrusion is embodied as a flow trap surrounding the outlet in the floor such that the protrusion diverts a mixture essentially to a direction flowing in the primary flow direction essentially counter to the primary flow direction.

11 Claims, 2 Drawing Sheets

DEVICE FOR PRODUCING MILK FROTH FOR CAPPUCCINO

BACKGROUND OF THE INVENTION

The invention relates to a device for producing milk froth for cappuccino. More particularly, the present invention relates to a device for producing milk froth for cappuccino, having a nozzle arrangement that is disposed downstream of a steam pipe and that has a vacuum chamber into which a milk supply line terminates, an air conduit connected to the milk supply line upstream of the vacuum chamber, an emulsifying chamber, having a chamber wall, a floor with a central, flow-diverting protrusion and an outlet, disposed downstream of the vacuum chamber, and a settling segment adjoining the outlet.

In a known device of this type for producing a creamy steam-milk-air emulsion for preparing cappuccino, a milk supply line, which has an air opening that is- connected to the atmosphere (U.S. Pat. No. 5,265,519), terminates into a vacuum chamber disposed downstream of a steam pipe having a nozzle. The steam-milk-air mixture produced in the vacuum chamber flows out of the vacuum chamber and into an emulsifying chamber having a closed floor with an essentially conical protrusion. The mixture flowing out of the vacuum chamber, against the central protrusion on the floor of the emulsifying chamber, is divided by the protrusion and reshaped into a new, large-surface mixture flow that impacts the floor of the side wall of the emulsifying chamber and is intended to mix thoroughly with a portion of the mixture already present in the emulsifying chamber to form a good emulsion. This process is supposed to produce a creamy mixture of fine froth that exits through a side opening of the emulsifying chamber and, from there, can flow into a further, cylindrical chamber located to the side of the emulsifying chamber. There, the emulsion settles while excess steam can escape through an upper opening of the additional chamber. This device has yet to achieve its objectives.

For more thoroughly premixing the milk suctioned into the vacuum chamber with air, it is already known to provide a premixing chamber between the vacuum chamber and the milk supply line, with the air conduit terminating into the premixing chamber (EP 0 858 757 A1). While this arrangement produces an extensively homogeneous steam-milk-air mixture in the vacuum chamber, the mixture can still be too large-pored.

Also known from the state of the technology is a device for frothing and heating liquids such as milk or the like. This device is equipped with longitudinal conduits for suctioning froth-producing air around a settling chamber having a relatively large cross ,section and a long length (EP 0 813 834 A1). In this device, first only the suctioned milk is mixed with steam in the vacuum chamber for pre-frothing. For producing the desired froth, the mixture is conducted into an acceleration segment that adjoins the vacuum chamber downstream, and is provided with openings that are connected to the air-conducting longitudinal conduits. The milk and froth are allowed to settle, and be homogeneously distributed, in the cylindrical chamber having the relatively large diameter and long length. This setup does not automatically achieve the desired fine-pore quality desired in many cases, however.

In a similar device, a second nozzle arrangement adjoins the vacuum chamber of the first nozzle arrangement. The second arrangement has air-intake openings that are more directly connected to the atmosphere than the openings connected via longitudinal conduits in the aforementioned arrangement (EP 0344 859 B1). In the second nozzle arrangement, air is suctioned and added to the milk to produce froth, which is then suctioned with the first nozzle arrangement. The froth flows out of a chamber that adjoins the second nozzle arrangement, the chamber having a relatively large diameter and long length, through lower, notably lateral, openings in the chamber, and consequently settles and is uniformly distributed. The floor of this chamber is shaped so as to prevent the froth from exiting directly at a high speed. For this purpose, the floor has a rounded protrusion. The floor has individual drip openings near the edge. This device also does not attain the desired fine-pored, homogeneously emulsified steam-milk-air mixture.

SUMMARY OF THE INVENTION

It is the object of the present invention to create a device for producing milk froth for cappuccino, with which the milk froth is homogeneously emulsified and fine-pored.

The above object generally is achieved according to the present invention with a device of the generic type described at the outset, wherein the emulsifying chamber, which is formed without separate air inlets, has at least two free cross sections that widen step-wise in the primary flow direction, and the central, flow-diverting protrusion is formed as a flow trap that surrounds the outlet in the floor such that the protrusion diverts a mixture flowing essentially in the primary flow direction essentially to a direction counter to the primary flow direction. Also disclosed are variations of the basic solution. The basic solution and vacations thereof are based on the common principle that the steam-milk-air mixture formed in the vacuum chamber after the premixing of the milk with air is mixed intensively again, and swirled, in the emulsifying chamber The mixture remains in the emulsifying chamber as long as possible, where it is emulsified into a fine-pored mixture due to the continuous flow of steam energy.

According to the basic solution, the cross sections of the emulsifying chamber, which increase step-wise in the downstream direction, strongly swirl the steam-milk-air mixture in the emulsifying chamber. The central, flow-diverting protrusion around the outlet in the floor of the emulsifying chamber, which is embodied as a flow trap, lengthens the time spent by the steam-milk-air mixture in the emulsifying chamber by diverting the mixture, which impacts the trap essentially in the primary flow direction, essentially counter to the primary flow direction. The primary flow direction is defined by the nozzle arrangement of the vacuum chamber, which changes over into the emulsifying chamber downstream. The settling segment adjoins this specially-designed emulsifying chamber by way of an outlet in the floor of the emulsifying chamber. The settling segment having the outlet can be embodied simply as a throughgoing bore.

An additional advantage of this device is its compact design.

For the basic inventive embodiment of the emulsifying chamber, it suffices to provide two segments that follow one after the other in the primary flow direction, with the first segment widening step-wise relative to an outlet of the vacuum chamber, and the second segment having a cross section that is widened, step-wise, relative to the first segment, in connection with the flow trap in the floor, i.e., the downstream end of the emulsifying chamber.

A significantly better option for attaining the desired fine-pored emulsion, according to a modification of the basic embodiment, is for the emulsion chamber to comprise three segments, whose cross sections widen, step-wise, relative to the cross section of the outlet of the vacuum chamber or the upstream adjacent segment. The flow trap is provided it the floor of the emulsifying chamber in this case as well.

According to a feature of the invention, the flow trap is embodied or formed as a blind ring having an annular trough that is open counter to the primary flow direction of the steam-milk-air mixture. The trough is embodied and oriented such that it diverts the steam-milk-air mixture, which impacts it essentially in the primary flow direction, essentially counter to the primary flow direction. This swirls the mixture again and keeps it in the emulsifying chamber longer.

In a further modification of the basic invention, a flow-diverting unit is disposed in the emulsifying chamber, at a distance from the floor. This unit is embodied such that the flow of the steam-milk-air mixture is diverted essentially counter to its primary flow direction. This flow diversion, again, effects a desired swirling of the flowing mixture in addition to the swirling effected by the flow trap that is always provided in the floor of the emulsifying chamber in accordance with the invention.

According to a preferred feature of the last mentioned embodiment, the flow-diverting unit call advantageously be embodied with an open, annular trough that surrounds a central, essentially conical protrusion. This trough can be embodied similarly to, but flatter than, the annular, open trough of the flow trap in the floor.

According to a feature of the invention, the flow-diverting unit is advantageously held in the emulsifying chamber, at a distance from the inside wall of the chamber, by radial ribs, so the flow can occur in the primary flow direction in the region of the inside wall.

In a variation of the device of the invention, the emulsifying chamber has diaphragms at the steps between its segments, with the diaphragms additionally narrowing the adjacent, smaller cross section. These diaphragms or narrow points form pronounced, turbulence-inducing edges that effect an even more vigorous swirling of the steam-milk-air mixture than the steps of the cross sections themselves.

Particularly for better cleaning, but also for the uncomplicated production of the emulsifying chamber and the adjacent regions, the emulsifying chamber has individual elements, which are cylindrical on the outside and are formed out with at least one of the stepped cross sections on the inside, and are held together by a common sleeve. All of the elements are disposed concentrically in the sleeve, which has a smooth outside surface.

According to a feature of the invention, the elements of the emulsifying chamber can comprise a half-hard synthetic material, notably chloroprene caoutchouc (brand name "Neopren"). This synthetic material also has a sufficient dimensional stability when exposed to steam.

In accordance with a combination feature of the device of the invention, a premixing chamber is preferably disposed between the vacuum chamber and the milk supply line; the air conduit terminates into this chamber. This assures the homogeneous air distribution of the emulsion, namely the entry of a thoroughly premixed milk-air mixture into the vacuum chamber before steam is added to the mixture and the additional swirling takes place in the emulsifying chamber.

Three variations of the invention are explained below by way of exemplary embodiments, with reference to the four drawing figures.

DESCRIPTION OF THE PREFERRED EMBODIMENTS

Figure 1:
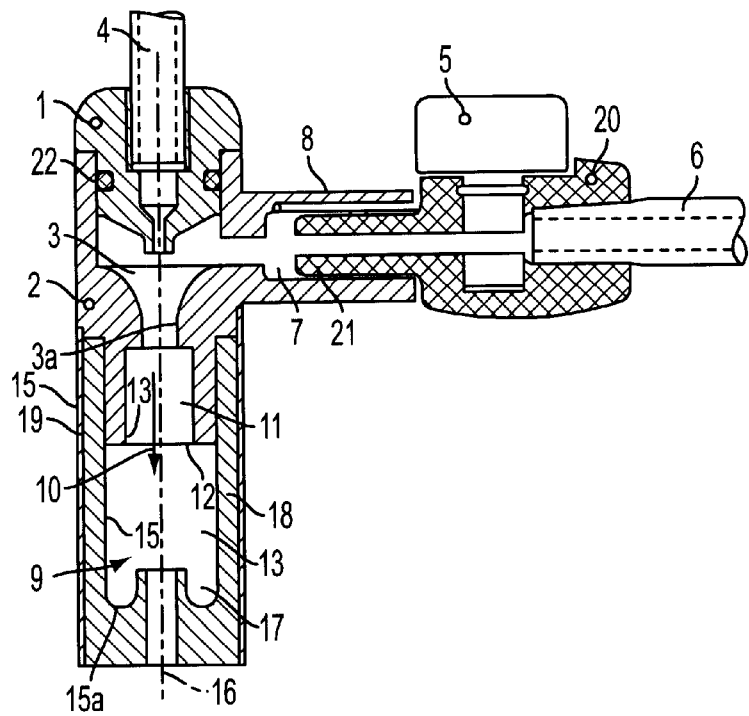
FIG. 1 is a longitudinal section through the first variation of the device according to the invention.

In all of the figures, corresponding parts are provided with the same reference characters.

The longitudinal sections all lie in a plane that extends vertically in the working position. All of the variations according to FIGS. 1 through 4 include a nozzle arrangement 1, 2 with a vacuum chamber 3. The nozzle arrangement 1, 2 is connected to a steam supply line 4, which is fed by a steam generator, of an espresso machine. The vacuum chamber 3 is connected by way of a flow-quantity-limiting element 5 to a milk supply line 6, which originates from an external milk container. A premixing chamber 7, into which an air conduit 8 terminates, is formed between the vacuum chamber and the flow-quantity-limiting element 5, on an end face of a cylindrical shoulder 21 of the limiting element.

At its downstream end, the vacuum chamber 3 changes over into a bore 3a, which leads to an emulsifying chamber 9. An arrow 10 indicates the primary flow direction. The cross section-length ratio of the bore is essentially closer to 1 than 1:10, as can be seen from the drawing.

The bore 3a extends into a first segment 11 of the emulsifying chamber having a relatively small clearance cross section or diameter. The bore is disposed coaxially with respect to the nozzle arrangement 1, 2. In the downstream direction, at a step 12, the first segment 11 changes over to a second, concentric segment 13 of the emulsify chamber 9, the second segment 13 having a larger cross-sectional surface or larger diameter downstream of the step 12. The lengths of the first segment 11 and the second segment 13 in the primary flow direction 10 can be larger than the diameters of these segments, but the ratio of the segment length to their diameter is considerably smaller than in a settling segment 16, where the ratio is typically 10:1. The inside walls 14, 15 of the first segment 11 and the second segment 13, respectively, have no air-intake openings.

A bore acting as a settling segment 16 is seated concentrically in a floor or bottom 15a of the second segment 13 of the emulsifying chamber 9. The bore of the settling segment 16 is surrounded by a blind ring 17 as a flow trap. As can be seen in detail in FIG. 1, the trap 17 is embodied i e. formed, as an annular trough that is open toward the top, counter to the primary flow direction 10.

The first segment 11 of the emulsifying chamber 9 is formed out of the element 2 of the nozzle arrangement, while an additional element 18, which is shaped approximately like a hollow cylinder with a floor, includes the second segment 13 of the emulsifying chamber 9, the settling segment 16 in the floor 15a and the blind ring 17 surrounding tile settling segment. For cleaning purposes, the element 2 and the additional element 18 are detachably held together by a sleeve 19. An O-ring 22 provides a seat between the elements 1 and 2 of the nozzle arrangement, one of which is inserted into the other.

The reference numeral 20 indicates a handle, which can be used to grasp the flow-quantity-limiting element 5 in order to insert it into or remove it from a receptacle of the nozzle arrangement.

When the milk supply line 6 is connected to a milk container, and steam flows into the nozzle arrangement 1, 2 by way of the steam supply line 4, milk and air are suctioned into the premixing chamber 7 by the vacuum created in the vacuum chamber 3, and premixed there This air-milk mixture flows into the vacuum chamber 3, in which steam is added to the mixture. The resulting steam-air-milk mixture flows, via the outlet or bore 3a into the first segment 11 of the emulsifying chamber 9 downstream of the vacuum chamber 3. A step, at which the mixture is additionally swirled, is formed between the bore 3a and the first segment 11 having a larger cross-sectional surface than the bore 3a. When the mixture exits the first segment 11 of the emulsifying chamber 9 via the step 12 and enters the second segment 13 of the emulsifying chamber 9, a new, additional swirling is effected under the continuous influence of the steam energy. Because of the embodiment of the floor region of the second segment 13 of the emulsifying chamber 9, the steam-milk-air mixture additionally swirled and emulsified in this manner remains in the chamber 9 significantly longer than with a floor 15a having one or more simple outlets. Here, the outlet formed in the floor by the bore of the settling segment 16 is surrounded by the blind ring 17, which represents a discharge trap, through which the mixture is conducted away from the outlet into the interior of the second segment 13 of the emulsifying chamber, where the mixture is re-swirled and thoroughly mixed with the steam-milk-air mixture flowing into the second segment.

The premixed steam-milk-air mixture entering the emulsifying chamber is intensively mixed and swirled multiple times in the emulsifying chamber before it can leave the chamber as a fine-pored emulsion.

Figure 2:
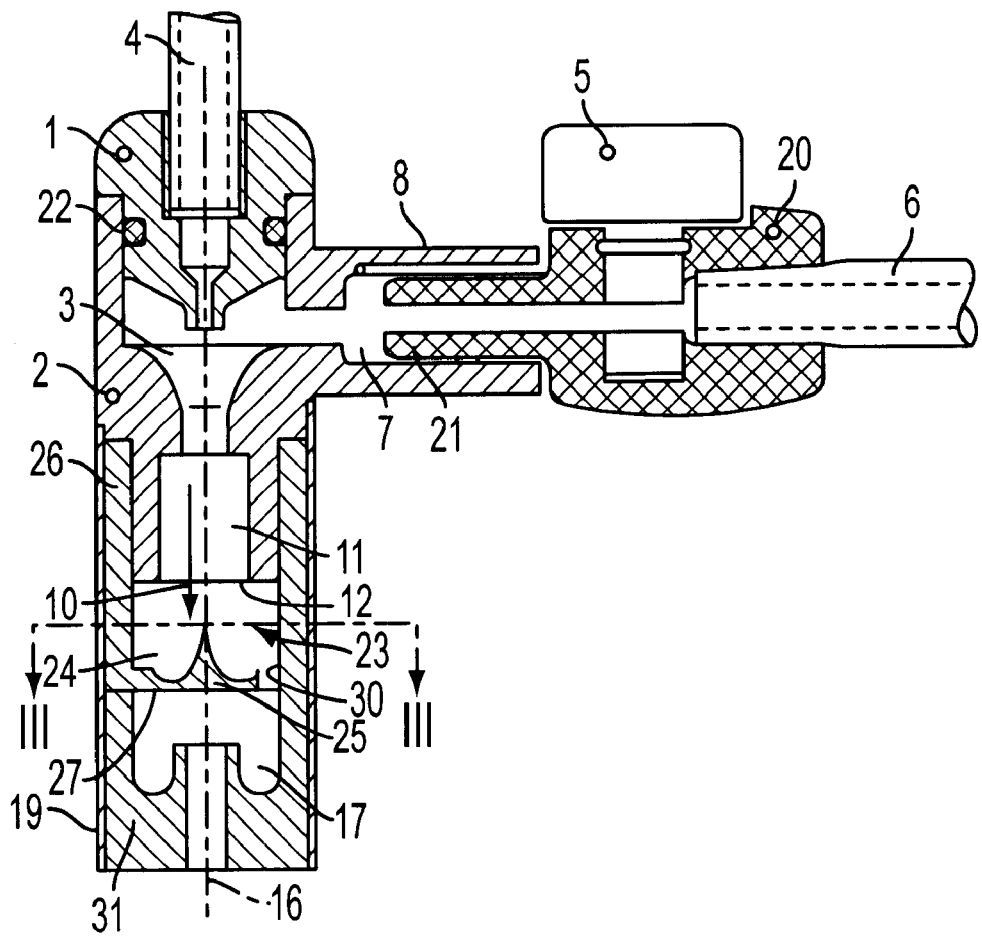
FIG. 2 is a longitudinal section through the second variation of the device according to the invention.
Figure 3:
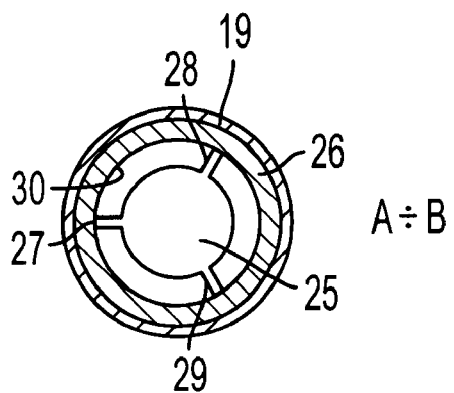
FIG. 3 is a cross section of the second variation of the intention, in the plane III—III in FIG. 2.

The variation of the device according to FIGS. 2 and 3 differs from the above-described first variation in that an additional flow-diverting unit 25 is disposed in the emulsifying chamber generally represented by 23, specifically in the second segment 24 having a larger free cross section at the step 12 than the first segment 11. This additional unit 25 is a component of an additional element 26, and is located at its downstream end. The unit 25 includes an annular trough, which is open toward the top and surrounds an essentially conical protrusion—FIG. 2—and diverts the steam-milk-air mixture flowing into the second segment of the emulsifying chamber 23 essentially upward, similarly to the blind ring 10 in the floury for effecting an additional swirling and thorough mixing before the steam-milk-air mix true can flow into the space directly above the blind ring 17, and then into the settling segment 16. For assuring this flow, radial ribs 27–29 are formed out between the flow-diverting unit 25 and an inside wall 30 of the element 26, as can be seen in FIG. 3 in connection with FIG. 2.

In this case, the second segment 24 of the emulsifying chamber 23 is not only formed by the additional element 26, but by a further additional element 31, which, includes the settling segment 16 and the blind ring 17. The elements 2, 26 and 31 are, again, held together in a concentric arrangement by the sleeve 19.

Figure 4:
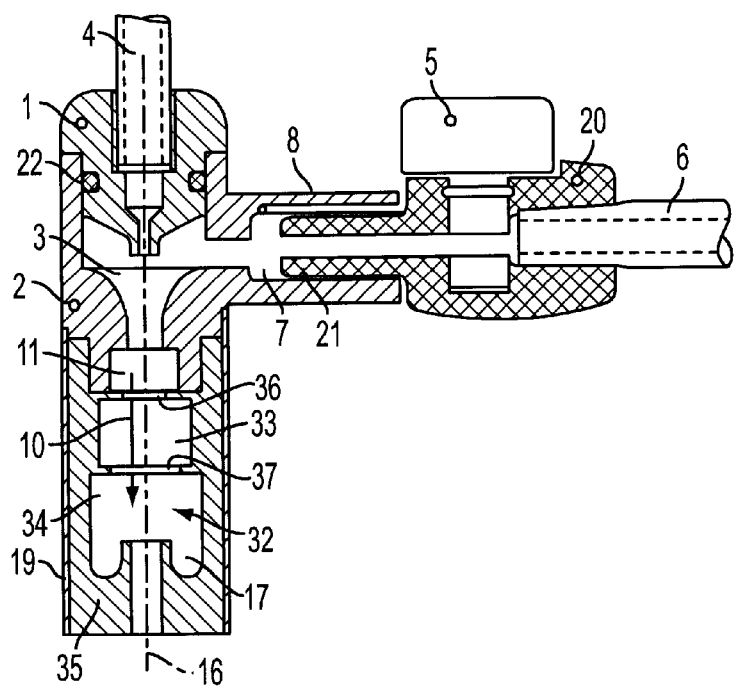
FIG. 4 is a longitudinal section through a third variation of the device according to the invention.

When seen in the flow direction 10, the third variation of the device, illustrated in FIG. 4, corresponds to the first and second variations, up to and including the first segment 11 of the emulsifying chamber represented in its entirety by 32.

In the third variation, a second segment 33 and a third segment 34 adjoin the first segment 11 of the emulsifying chamber 32. The second segment 33 and the third segment 34 are formed out of a one-piece, additional element 35. The first segment 11, the second segment 33 and the third segment 34 of the emulsifying chamber 32 follow one after the other in tie primary flow direction 10, with each having a dramatically larger free cross-sectional surface than the last segment. Instead of the steps formed between the segments, in this case round diaphragms 36, 37 are formed out The diaphragms 36, 37 have smaller cross sections than the adjacent segments, and thus constitute turbulence-inducing edges that project into the flow path of the steam-milk-air mixture and create more intense swirling than the steps of the first and second variations. The swirling is thus enhanced by the three cascading segments 11, 33, 34 whose diameters increase step-wise in the primary flow direction. The three segments are so short in the flow direction 10 that the swirling action is activated by the continuously flowing steam energy, and no settling occurs. The fine-pored, emulsified steam-milk-air mixture flowing through the settling segment 16 in the floor of the element 35 does not settle until it has negotiated the flow trap formed by the blind ring 17.

What is claimed is:

1. A device for producing milk froth for cappuccino, comprising:

a nozzle arrangement having a first inlet for connection to the output of a steam pipe and having a vacuum chamber with a second inlet for connection to a milk supply line;

an air conduit connected to the second inlet upstream of the vacuum chamber, whereby an air/milk mixture is supplied to the vacuum chamber;

an emulsifying chamber connected to the outlet of the vacuum chamber and having a chamber wall, a floor with a central, flow-diverting protrusion and an outlet; and a settling segment adjoining the outlet; arid, wherein the emulsifying chamber is formed without separate air inlets and has at least two free cross sections that widen step-wise in the primary flow direction, and the central, flow-diverting protrusion is formed as a flow trap that surrounds the outlet in the floor such that the protrusion diverts a mixture flowing essentially in the primary flow direction essentially to a direction counter to the primary flow direction.

2. The device according to claim 1, wherein the emulsifying chamber has three free cross sections that widen step-wise in the primary flow direction.

3. The device according to claim 1, wherein in the emulsifying chamber, a flow-diverting unit is disposed at a distance from the floor the unit being shaped so as to effect a flow diversion essentially counter to the primary flow direction of the mixture.

4. The device according to claim 3, characterized in that the flow-diverting unit (25) is embodied with an annular, open trough that surrounds a central, essentially conical protrusion.

5. The device according to claim 3, wherein the flow-diverting unit is held in the emulsifying chamber at a distance from the inside chamber wall, by radial ribs.

6. The device according to claim 1, wherein the emulsifying chamber has diaphragms at steps between the step-wise widened free cross sections, with the diaphragms additionally reducing the adjacent, smaller cross section at one of the steps.

7. The device according to claim 1, wherein the emulsifying chamber is formed of individual elements that are essentially cylindrical on the outside, are formed with at least one of the stepped cross sections on the inside, and are held together by a common sleeve.

8. The device according to claim 7, wherein the half-hard synthetic material is chloroprene caoutchouc.

9. The device according to claim 7, wherein the elements of the emulsifying chamber comprise a half-hard synthetic material.

10. The device according to claim 1, wherein a premixing chamber is disposed between the vacuum chamber and the second inlet for milk supply line with the air conduit terminating into the premixing chamber.

11. The device according to claim 8, wherein the flow trap is formed as a blind ring.

* * * * *

UNITED STATES PATENT AND TRADEMARK OFFICE
CERTIFICATE OF CORRECTION

PATENT NO. : 6,499,389 B1 Page 1 of 1
DATED : December 31, 2002
INVENTOR(S) : Emanuel Probst It is certified that error appears in the above-identified patent and that said Letters Patent is hereby corrected as shown below:

<u>Title page,</u>
Item [73], Assignee, delete "Elekroapparate" and insert -- Elektroapparate --; and after "Niederbuchsiten" insert -- Switzerland --.

Signed and Sealed this

First Day of June, 2004

JON W. DUDAS
*Acting Director of the United States Patent and Trademark Office*